No. 748,252. PATENTED DEC. 29, 1903.
S. J. ANDERSON.
CONTROLLING GEAR FOR AUTOMOBILES.
APPLICATION FILED APR. 27, 1903.
NO MODEL.
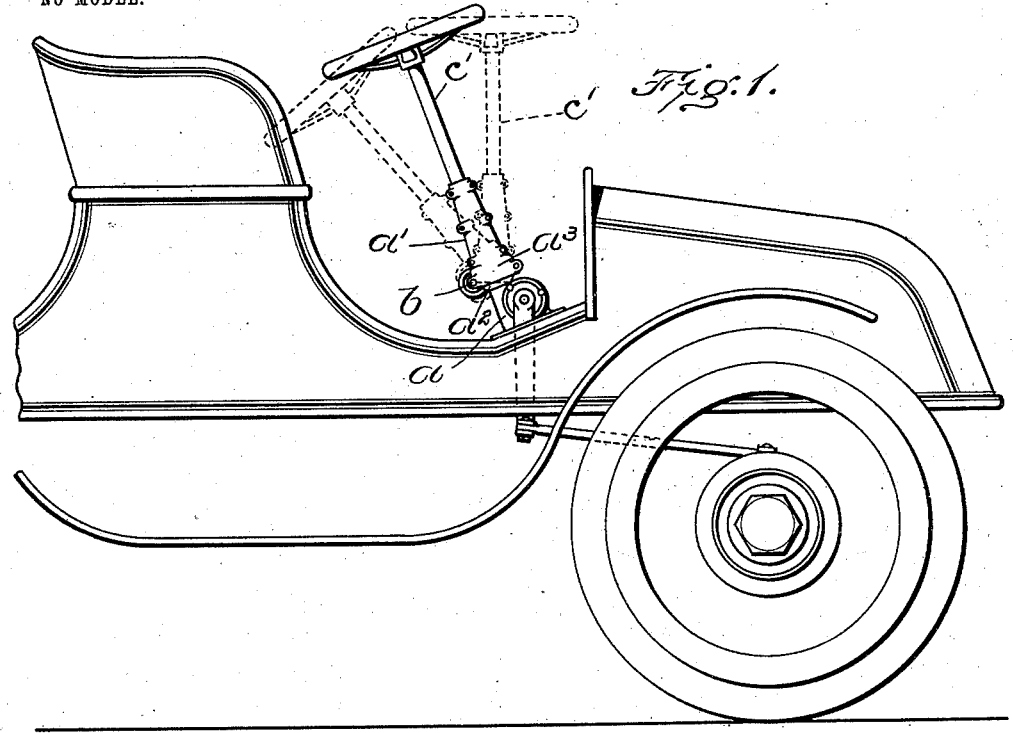
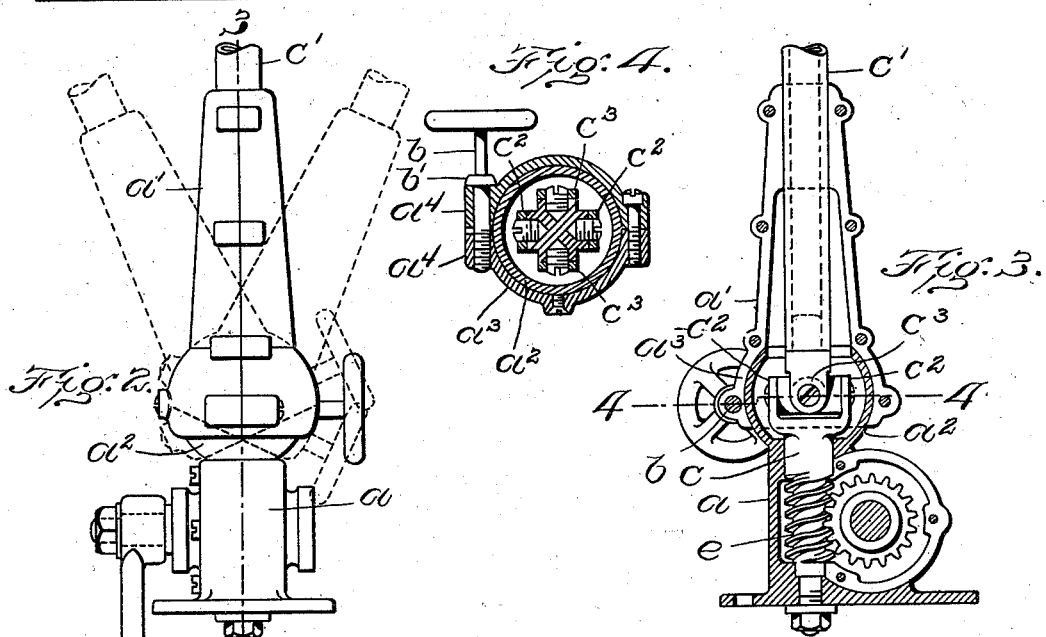

No. 748,252.

Patented December 29, 1903.

UNITED STATES PATENT OFFICE.

SVEN J. ANDERSON, OF WINCHESTER, MASSACHUSETTS.

CONTROLLING-GEAR FOR AUTOMOBILES.

SPECIFICATION forming part of Letters Patent No. 748,252, dated December 29, 1903.

Application filed April 27, 1903. Serial No. 154,386. (No model.)

*To all whom it may concern:*

Be it known that I, SVEN J. ANDERSON, of Winchester, in the county of Middlesex and State of Massachusetts, have invented certain new and useful Improvements in Controlling-Gear for Automobiles, of which the following is a specification.

This invention relates to the handle portions of steering or other controlling gear for automobiles and other like vehicles; and it has for its object to enable the upper or handle portion of a steering or other controlling member to be firmly supported at any angle or position which the convenience of the operator may require.

The invention consists in the improvements which I will now proceed to describe and claim.

Of the accompanying drawings, forming a part of this specification, Figure 1 represents a side elevation of a carriage having a jointed bearing or support containing a jointed steering member, all constructed in accordance with my invention. Fig. 2 represents an elevation of said bearing and a part of the post from a different point of view. Fig. 3 represents a section on line 3 3 of Fig. 2. Fig. 4 represents a section on line 4 4 of Fig. 3.

The same reference characters indicate the same parts in all the figures.

In the drawings, $a$ and $a'$ represent a casing or bearing to support and prevent the rotation of the steering-post of a steering mechanism, the said casing or bearing being made in two parts or sections. The section $a$ is affixed rigidly to the vehicle and is provided with a member of a universal joint, said member, as here shown, being an approximately spherical enlargement or ball $a^2$, formed on the upper portion of the section $a$, said ball being hollow. The section $a'$ is provided at its lower end with a complemental universal-joint member, here shown as a socket $a^3$ formed to fit and turn freely in any direction upon the ball member, the said socket being split to render it compressible and provided with ears or lugs $a^4$, located at opposite sides of the split and provided with a clamping or binding screw $b$, engaged with one of said ears, which is internally threaded, said screw having a shoulder $b'$ bearing on the other ear. The screw $b$ is adapted to tighten the socket member and lock it by friction to the ball member in various positions. The movable section $a'$ of the bearing is therefore adapted to stand at any angle which the convenience of the operator may require and to be locked in any of the positions to which it may be adjusted.

The steering member is composed of two parts, a stationarily-journaled section $c$ and a swinging section or post $c'$. The section $c$ is journaled in the fixed section $a$ of the bearing, while the section $c'$ is journaled in the movable bearing-section $a'$. The sections $c$ and $c'$ are provided with universal-joint coupling or connecting members located within the hollow ball member $a^2$, the said members being here shown as comprising an ordinary gimbal-joint composed of a pair of ears $c^2$, affixed to the section $c$, another pair of ears, $c^3$, affixed to the section $c'$, and suitable connections between said ears, the arrangement being such that motion can be transmitted from the section $c'$ to the section $c$ in any of the positions to which the section $c'$ can be adjusted.

It will be seen that the gimbal-joint connection between the sections of the steering member enables the upper portion or post $c'$ to be adjusted with the upper section $a'$ of the bearing.

The lower section $c$ of the steering member is provided with suitable means, such as a worm $e$, for imparting motion to other parts of the steering gear or mechanism.

I disclaim as of my invention the broad idea of a swinging or universally-steering or other controlling post in an automobile provided with means having an adjustable connection with the post for supporting it against such movement.

I claim—

1. In a vehicle, the combination of a controlling-post mounted for universal swinging movement and rotary operating movement, frictional locking means in continuous connection therewith for supporting said post against such movement, and vehicle-controlling mechanism actuated by the rotary movement of said post.

2. In a vehicle, the combination of a controlling-post having a rotary or twisting controlling movement and a universal swinging movement, frictional locking means in continuous connection therewith for supporting said post against said universal movement, and connections for transmitting the rotary movement of said post to the vehicle-controlling mechanism.

3. In a vehicle, the combination of a controlling-post mounted for a swinging adjusting movement and a rotary operating movement, means exerting a continuous action on said post for holding it in different angular positions within its range of swinging movement, said means being capable of having its holding action overcome by the exertion of force to swing the post, and vehicle-controlling mechanism actuated by the rotary movement of said post.

4. In a vehicle, the combination of a controlling-post mounted for a swinging adjusting movement and a rotary operating movement, coacting frictional sliding surfaces exerting a uniform holding action in a plurality of different indeterminate angular positions within the range of swinging movement of the post for holding the latter in said positions, and vehicle-controlling mechanism actuated by the rotary movement of said post.

5. In a vehicle, the combination of a controlling-post mounted for universal swinging movement, and coacting spherical frictional locking-surfaces curved in a radius coinciding with the center of swinging movement of said post for supporting the latter against such movement.

6. An automobile-controlling mechanism comprising a jointed casing or bearing composed of a fixed section and a movable section, said sections being provided with universal-joint coupling or connecting members, and a jointed vehicle-controlling member rotatable in said bearing and composed of two sections also provided with universal-joint coupling or connecting members located within the coupling members of the bearing.

7. An automobile-controlling mechanism comprising a jointed casing or bearing composed of a fixed section and a movable section, said sections being provided with universal-joint coupling or connecting members having locking means whereby the movable section may be held in various positions, and a jointed vehicle-controlling member rotatable in said bearing and composed of two sections also provided with universal-joint coupling or connecting members located within the coupling members of the bearing.

8. An automobile-controlling mechanism comprising a jointed casing or bearing composed of a fixed section having a ball coupling member and a movable section having a compressible socket coupling member engaged with the said ball member, said socket member being provided with a binding or compressing screw, and a jointed vehicle-controlling member rotatable in said bearing and composed of two sections also provided with universal-joint coupling or connecting members located within the said ball coupling member.

In testimony whereof I have affixed my signature in presence of two witnesses.

SVEN J. ANDERSON.

Witnesses:
C. F. BROWN,
E. BATCHELDER.